United States Patent
Kodama et al.

(10) Patent No.: US 6,843,344 B2
(45) Date of Patent: Jan. 18, 2005

(54) VEHICLE STEERING CONTROL SYSTEM

(75) Inventors: Kazumasa Kodama, Toyota (JP); Yutaka Mori, Toyohashi (JP); Junji Kawamuro, Susono (JP); Takahiro Kojo, Susono (JP); Masatoshi Nakatsu, Susono (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/626,644

(22) Filed: Jul. 25, 2003

(65) Prior Publication Data

US 2004/0206569 A1 Oct. 21, 2004

(30) Foreign Application Priority Data

Jul. 26, 2002 (JP) ........................................ 2002-217730

(51) Int. Cl.[7] ............................................... B62D 5/04
(52) U.S. Cl. ......................... 180/446; 180/444; 701/41
(58) Field of Search .................................. 180/446, 444

(56) References Cited

U.S. PATENT DOCUMENTS

| 4,945,298 A | | 7/1990 | Nakashima |
| 6,102,151 A | * | 8/2000 | Shimizu et al. ............. 180/446 |
| 6,249,099 B1 | | 6/2001 | Nessi et al. |
| 6,367,577 B2 | * | 4/2002 | Murata et al. ............... 180/446 |
| 6,591,937 B2 | * | 7/2003 | Badenoch et al. ........... 180/446 |
| 2001/0027895 A1 | * | 10/2001 | Murata et al. ............... 180/446 |
| 2004/0031641 A1 | * | 2/2004 | McLaughlin ................ 180/446 |

FOREIGN PATENT DOCUMENTS

| JP | 11-334604 | 12/1999 |
| JP | 11-334628 | 12/1999 |

* cited by examiner

*Primary Examiner*—Lesley D. Morris
*Assistant Examiner*—Tony Winner
(74) *Attorney, Agent, or Firm*—Oblon, Spivak, McClelland, Maier & Neustadt, P.C.

(57) ABSTRACT

A PWM control includes a first PWM control and a second PWM control. In the first PWM control, a first power supply terminal of a first coil is kept non-switched under being connected to a first pole of a direct current power source, and a second power supply terminal of a second coil is capable of being switched under being connected to a second pole of the direct current power source. The second PWM control is performed by switching a first connected condition and a second connected condition by turns. The first connected condition is established with the first power supply terminal connected to the first pole and the second power supply terminal connected to the second pole. The second connected condition is established with the first power supply terminal being connected to the second pole and the second power supply terminal being connected to the first pole.

6 Claims, 15 Drawing Sheets

| Vehicle Speed (V) | $V_1$ | $V_2$ | $V_3$ | ............... | $V_n$ |
|---|---|---|---|---|---|
| Steering Angle Conversion Ratio ($\alpha$) | $\alpha_1$ | $\alpha_2$ | $\alpha_3$ | | $\alpha_n$ |

130

$\alpha = \theta / \phi$   $\phi$: Steering wheel shaft angle position
$\theta$: Vehicle wheel steering shaft angle position

131

| Vs \ Δθ | $Vs_1$ | $Vs_2$ | $Vs_3$ | $Vs_4$ | ... | $Vs_n$ |
|---|---|---|---|---|---|---|
| $\Delta\theta_1$ | $\eta_{11}$ | $\eta_{12}$ | $\eta_{13}$ | $\eta_{14}$ | ... | $\eta_{1n}$ |
| $\Delta\theta_2$ | $\eta_{21}$ | $\eta_{22}$ | $\eta_{23}$ | $\eta_{24}$ | ... | $\eta_{2n}$ |
| $\Delta\theta_3$ | $\eta_{31}$ | $\eta_{32}$ | $\eta_{33}$ | $\eta_{34}$ | ... | $\eta_{3n}$ |
| $\Delta\theta_4$ | $\eta_{41}$ | $\eta_{42}$ | $\eta_{43}$ | $\eta_{44}$ | ... | $\eta_{4n}$ |
| ⋮ | ⋮ | ⋮ | ⋮ | ⋮ | ⋮ | ⋮ |
| $\Delta\theta_m$ | $\eta_{m1}$ | $\eta_{m2}$ | $\eta_{m3}$ | $\eta_{m4}$ | ... | $\eta_{mn}$ |

$\eta$ : Duty Ratio $\Delta\theta = \theta' - \theta$ $\theta'$ : Target vehicle wheel steering shaft angle position
$\theta$ : Current vehicle wheel steering shaft angle position

FIG. 11

VEHICLE STEERING CONTROL SYSTEM

CROSS REFERENCE TO RELATED APPLICATIONS

This application is based on and claims priority under 35 U.S.C. § 119 with respect to a Japanese Patent Application 2002-217730, filed on Jul. 26, 2002, the entire content of which is incorporated herein by reference.

FIELD OF THE INVENTION

This invention generally relates to a steering control system for a vehicle such as an automobile.

BACKGROUND OF THE INVENTION

In a conventional steering control system for a vehicle especially for an automobile, an operation angle of a steering wheel (i.e. a steering wheel operation angle) has been publicly known to be transmitted to a vehicle wheel to be steered without being varied. That is, the steering wheel operation angle is always transferred at one for one rate for a vehicle wheel steering angle. However, recent developments have lead to the vehicle steering control system mounting a variable steering angle conversion ratio mechanism by which a conversion ratio for converting the steering wheel operation angle to the vehicle wheel steering angle (hereinafter, referred to as a steering angle conversion ratio) is varied in accordance with vehicle driving conditions such as a vehicle speed. At a time of vehicle high-speed travel, it is preferable to set the steering angle conversion ratio to be a relatively small ratio. In this case, the steering angle can be prevented from being rapidly increased in response to increase of the steering wheel operation angle, thereby enabling to stabilize the vehicle high-speed travel. On the other hand, at a time of vehicle low-speed travel, it is preferable to set the steering angle conversion ratio to be a relatively large ratio. In this case, the vehicle wheel can be steered to the maximum steering extent possible with the small steering wheel operation angle. That is, the driver does not have to operate the steering wheel many times so as to steer the vehicle wheel to the maximum steering extent possible. Therefore, it makes easier to perform driving performance, which requires the vehicle wheel to be steered at a relatively large steering angle, such as parking to a garage, parallel parking, and pulling over to the kerb.

This type of variable steering angle conversion ratio mechanism has been disclosed in a Japanese Patent Laid-Open Publication published as No. 1999-834604. Disclosed above is a geared transmitting unit which connects a shaft connected to the steering wheel and a vehicle wheel steering shaft with a variable gear ratio. However, a gear ratio changing mechanism of the geared transmitting unit may become complicated.

In another Japanese Patent Laid-Open Publication published as No. 1999-334628, disclosed is a vehicle steering control unit with a variable steering angle conversion ratio mechanism in which the vehicle wheel steering shaft is driven for its rotation by an electric motor. More particularly, a target vehicle wheel steering angle is computed based upon the steering wheel operation angle detected by an angle detecting unit and the steering angle conversion ratio determined in accordance with the vehicle driving conditions. A motor rotates the vehicle wheel steering shaft, which is mechanically disconnected from the shaft connected to the steering wheel, so as to steer the vehicle wheel at the target vehicle wheel steering angle.

According to the vehicle steering control unit with the variable steering angle conversion ratio mechanism, it is preferable that the vehicle wheel steering shaft rotates in compliance with the rotation of the shaft connected to the steering wheel. Therefore, a rotational speed of an electric motor shaft has been adjusted by a pulse width modulation control (hereinafter, referred to as a PWM control) so as to decrease or vanish an angle deviation of a steering shaft angle position of the vehicle wheel steering shaft from a target angle position thereof.

The electric motor may be frequently driven for rotate the vehicle wheel steering shaft in response to the frequent operation of the steering wheel. Therefore, the electric motor is demanded to operate stably over a long period of time, which may lead to enhancement of vehicle durability. For example, the operating performance of the motor may deteriorate after being applied with excessive electric current over a long period of time. In light of foregoing, the operation of the motor can be appropriately adjusted by restraining the electric current to be supplied to the motor. An electric current sensor can be used for monitoring a value of the electric current being supplied to the electric motor.

However, in the motor applied with the PWM control, large flywheel current may occur due to inductive load characteristics at a time of switching on/off an electric power source such that the electric current being supplied to the motor may not be detected precisely.

A need thus exists for providing a vehicle steering control system capable of detecting the electric current supplied to the motor under the PWM control.

SUMMARY OF THE INVENTION

In light of the foregoing, according to an aspect of the present invention, a steering control system for a vehicle includes a steering wheel shaft transmitted with an operation angle of a steering wheel, a vehicle wheel steering shaft to be steered at a vehicle wheel steering angle depending on the operation angle of the steering wheel and a vehicle driving condition, and a motor for rotating the vehicle wheel steering shaft at the vehicle wheel steering angle.

The steering control system further includes a steering wheel shaft angle detecting means for detecting a steering wheel shaft angle position, a vehicle wheel steering shaft angle detecting means for detecting a vehicle wheel steering shaft angle position, a vehicle condition detecting means for detecting the vehicle driving condition, a drive controlling means for determining a target angle position of the vehicle wheel steering shaft based upon the steering wheel shaft angle position and the vehicle driving condition and for approximating the vehicle wheel steering shaft angle position to the target angle position, and a current detecting means for detecting an electric current supplied to the motor.

A rotational speed of the motor is adjusted by a duty ratio of a pulse width modulation control in response to an angle deviation of the vehicle wheel steering shaft angle position from the target angle position so as to follow the rotation of the vehicle wheel steering shaft to the rotation of the steering wheel shaft. The motor is electrically excited by a direct current power source via first and second coils included in the motor. A one end of the first coil is connected to one end of the second coil, the other end of the first coil and the other end of the second coil serve as a first power supply terminal and a second power supply terminal so as to electrically excite the first and second coils respectively.

The PWM control includes a first PWM control and a second PWM control. The first PWM control is performed with the first and second power supply terminals. According to the first PWM control, the first power supply terminal is kept non-switched under being connected to a first pole of the direct current power source, and the second power supply terminal is capable of being switched under being connected to a second pole of the direct current power source. The second PWM control is performed by switching a first connected condition and a second connected condition by turns. According to the second PWM control, the first connected condition is established with the first power supply terminal being connected to the first pole of the direct current power source and the second power supply terminal being connected to the second pole thereof. The second connected condition is established with the first power supply terminal being connected to the second pole thereof and the second power supply terminal being connected to the first pole.

The steering control system of the present invention further includes a PWM control selecting means included in the drive controlling means. The PWM control selecting means selects the first PWM control or the second PWM control. The first PWM control is performed under a first driving condition in which the motor is supplied with an electric current being smaller than a reference value, and the second PWM control is performed under a second driving condition in which the motor is supplied with an electric current being greater than the reference value.

BRIEF DESCRIPTION OF THE DRAWING FIGURES

The foregoing and additional features and characteristics of the present invention will become more apparent from the following detailed description considered with reference to the accompanying drawing figures wherein:

FIG. 11 is a two-dimensional table for obtaining a duty ratio corresponding to a power supply voltage and an angle deviation $\Delta\theta$;

DETAILED DESCRIPTION OF THE INVENTION

An embodiment of the present invention will be described hereinbelow in detail with reference to the accompanying drawings.

Figure 1:
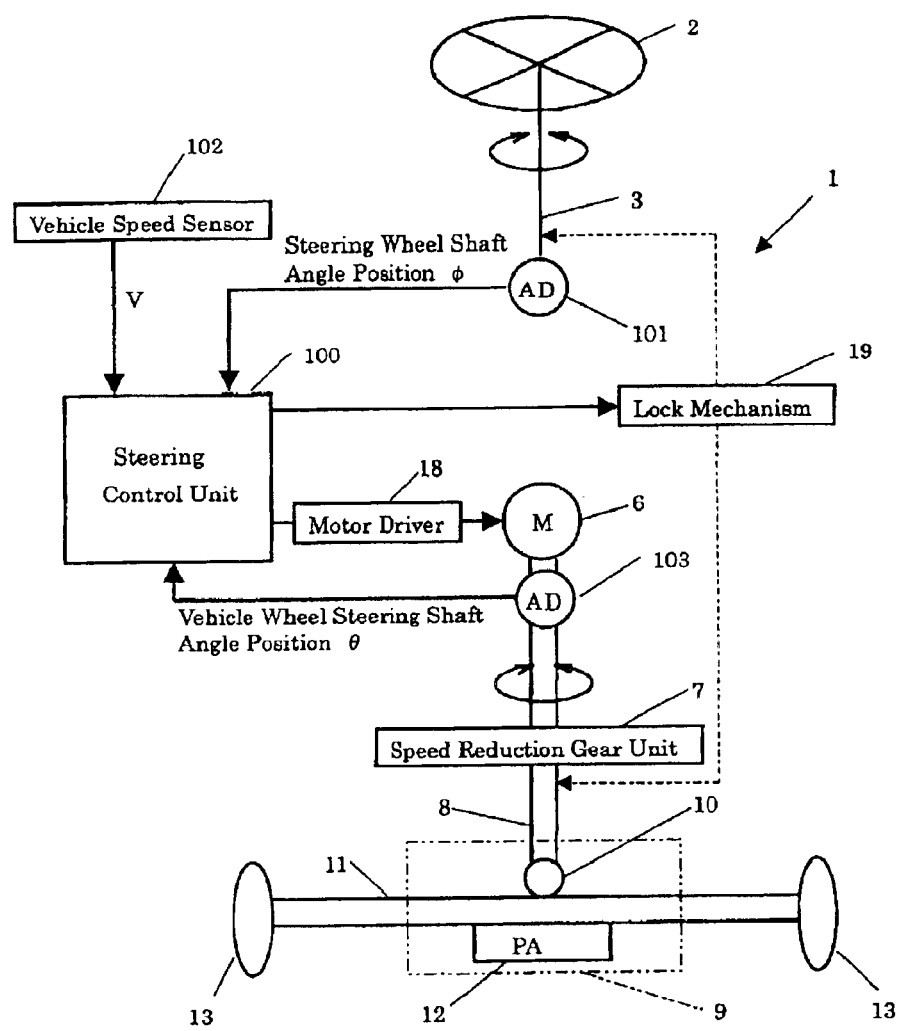
FIG. 1 is a diagram schematically illustrating an entire structure of a steering control system for a vehicle according to an embodiment of the present invention.

As illustrated in FIG. 1, a vehicle steering control system 1 according to the embodiment of the present invention includes a shaft 3 connected directly to a steering wheel 2 (hereinafter, referred to as a steering wheel shaft 3), and a shaft 8 for a vehicle to be steered (hereinafter, referred to as a vehicle wheel steering shaft 8) which is mechanically disconnected from the steering wheel shaft 3. The vehicle wheel steering shaft 8 is rotatably driven by a motor as an actuator. A one end of the vehicle wheel steering shaft 8 extends into a steering gear unit 9 in which a pinion gear 10 rotatable with the vehicle wheel steering shaft 8 reciprocates a rack bar 11 in an axial direction thereof. Therefore, a steering angle of each front-left vehicle wheel (or rear-left vehicle wheel) 13 and front-right vehicle wheel (or rear-right vehicle wheel) 13 can be changed. The vehicle steering control system 1 according to the embodiment of the present invention is provided with a known power steering apparatus in which driving torque for reciprocating the rack bar 11 can be reinforced by a known power assisting mechanism 12. The power assisting mechanism 12 can operate in a hydraulic manner, an electrically driven manner, or an electrically driven and hydraulic manner.

The vehicle steering control system 1 further includes a steering control unit 100 (i.e. a drive controlling means), a steering wheel shaft angle detecting unit 101 (i.e. a steering wheel shaft angle detecting means), a vehicle wheel steering shaft angle detecting unit 103 (i.e. a vehicle wheel steering shaft angle detecting means), and a vehicle speed detecting unit (e.g. a vehicle speed sensor) 102 (i.e. a vehicle condition detecting means) for detecting a vehicle speed V. The steering wheel shaft angle detecting unit 101 is configured with a known angle detecting unit such as a rotary encoder and detects an angle position $\phi$ of the steering wheel shaft 3 (hereinafter, referred to as a steering wheel shaft angle position $\phi$). The vehicle wheel steering shaft angle detecting unit 103 is configured with a known angle detecting unit such as a rotary encoder and detects an angle position $\theta$ of the vehicle wheel steering shaft 8 hereinafter, referred to as a vehicle wheel steering shaft angle position θ). The vehicle speed detecting unit 102 is configured with a rotation detecting unit such as a rotary encoder and a taco generator and detects a rotation of a vehicle wheel 13. The steering control unit 100 then computes a target angle position θ' of the vehicle wheel steering shaft 8 based upon the steering wheel shaft angle position φ and the vehicle speed V. Driving the motor 6 is controlled by a motor driver 18 (i.e. a driver) so as to approximate or match the vehicle wheel steering shaft angle position θ to the target angle position θ'.

Disposed is a lock mechanism 19 between the steering wheel shaft 3 and the vehicle wheel steering shaft 8. The lock mechanism 19 establishes a locked condition, in which the steering wheel shaft 3 and the vehicle wheel steering shaft 8 are connected to each other for their integral rotation, and an unlocked condition, in which the shafts 3 and 8 are released from the connected condition. In the locked condition thereof, the operation angle of the steering wheel shaft 3 can be transferred to the vehicle wheel steering shaft 8 at one for one ratio of a steering angle conversion ratio, wherein a manual steering operation can be performed. The lock mechanism 19 is switched to the locked condition in response to a command signal from the steering control unit 100 at a time of, for example, malfunction of the motor 6.

Figure 2:
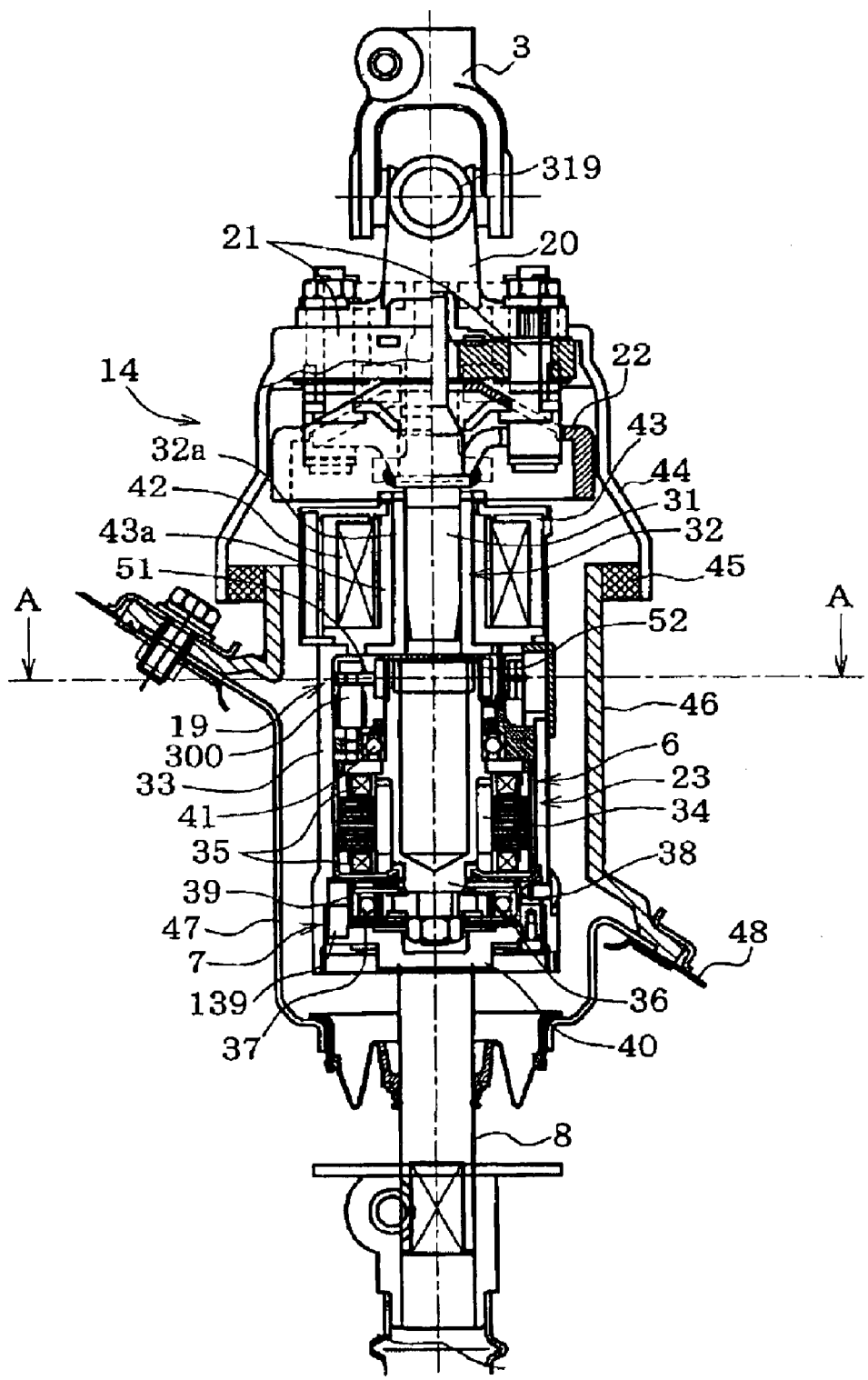
FIG. 2 is a longitudinal sectional view illustrating a driving unit according to the embodiment of the present invention.

As seen in FIG. 2, in a driving unit 14 having the motor 6, an approximately cylindrically shaped motor case 33 is integrally rotated with the motor 6 assembled inside thereof when the steering wheel shaft 3 rotates in response to the operation of the steering wheel 2. The steering wheel shaft 3 is jointed with an input shaft 20 via a universal joint 319. The input shaft 20 is coupled to a first coupling member 22 via bolts 21. A pin 31 is integrally provided in the first coupling member 22. The pin 31 is received in a sleeve 32*a* in a messed manner therewith. The sleeve 32*a* rearwardly extends from a central portion of a plate surface at one end of a second coupling member 32. The motor case 33 is integrated with a plate surface at the other end of the second coupling member 32. A cover case 44, which is made of resin or rubber, is integrally rotated with the steering wheel shaft 3. The driving unit 14 is integrally provided with a cockpit panel 48 and is housed in a case 46. A clearance between the cover case 44 and the case 46 is sealed by a sealing ring 45.

Assembled integrally inside the motor case 33 is a stator portion 23 including stator coils 35 (i.e. three phases U, V, W). A motor output shaft 36 is disposed inside the stator portion 23 via a bearing 41 for its rotation. An armature 34 made of a permanent magnet is integrally disposed at an outer peripheral surface of the motor output shaft 36. FIG. 2 shows the stator coils 35 arranged at both axial ends of the armature 34 in a sectional view. Power supply terminals 50 extend from the stator coils 35 (U, V, W) in a direction of a rear end surface of the motor case 33. The stator coils 35 are supplied with electric current by a power supply cable 42 of which one end is connected to each power supply terminal 50.

As described later, the motor 6 is a brushless motor according to the embodiment of the present invention. The power supply cable 42 is configured with a band of wire set gathering wires for supplying electric power to the stator coil 35 for each phase (U, V, W) of the brushless motor. The power supply cable 42 is housed in a cable case 43 as being wound around a hub 43*a* of the cable case 43. The hub 43*a* is arranged adjacent to the rear end side of the motor case 33. The other end of the power supply cable 42 is fixed to the hub 43*a* of the cable case 43. When the steering wheel shaft 3 is rotated with the motor case 33 and the power supply terminal 50 in a forward or reverse direction, the power supply cable 42 is wound inwards around the hub 43*a* or fed outwards such that the rotation of the motor case 33 can be effectively absorbed.

The rotational speed of the motor output shaft 36 is decelerated by a speed reduction gear unit 7 and is transmitted to the vehicle wheel steering shaft 8 at a predetermined ratio, for example at 5 for 50 ratio. According to the embodiment of the present invention, the reduction gear unit 7 is configured with a harmonic drive reduction unit. That is, an elliptical bearing 37 with an inner race is integrally provided on the motor output shaft 36. A deformable external gear 38 is disposed at an outer side of the bearing 37. A first internal gear 39 and a second internal gear 139 are coaxially arranged at the outer side of the external gear 38 via a coupling 40 so as to be meshed with the eternal gear 38. The first and second internal gears 39 and 139 are integrated with the vehicle wheel steering shaft 8. The first internal gear 39 is fixed to the motor case 33 for its integral rotation therewith. The second internal gear 139 is not fixedly assembled to the motor case 33 such that the second internal gear 139 is rotatable relative to the motor case 33. The number of teeth of the first internal gear 39 is the same as the one of the external gear 38 such that the first integral gear 39 is not rotated relative to the external gear 38. That is, the first internal gear 39, the motor case 33, and the steering wheel shaft 3 are connected to the motor output shaft 36 for their idle rotation. The number of teeth of the second internal gear 139 is greater than the one of the external gear 38, for example by two teeth. Assuming that the number of teeth of the second internal gear 139 is "N", and the difference of the number of teeth between the external gear 38 and the second internal gear 139 is "n", the rotational speed of the motor output shaft 36 is decelerated at a rate of n for N (n/N) and is transmitted to the vehicle wheel steering shaft 8. According to the embodiment of the present invention, the input shaft 20 of the steering handle shaft 3 is assembled to be coaxial with the motor output shaft 36 and the vehicle wheel steering shaft 8, thereby enabling to size-down the driving unit 14 including the motor 6.

Figure 3:
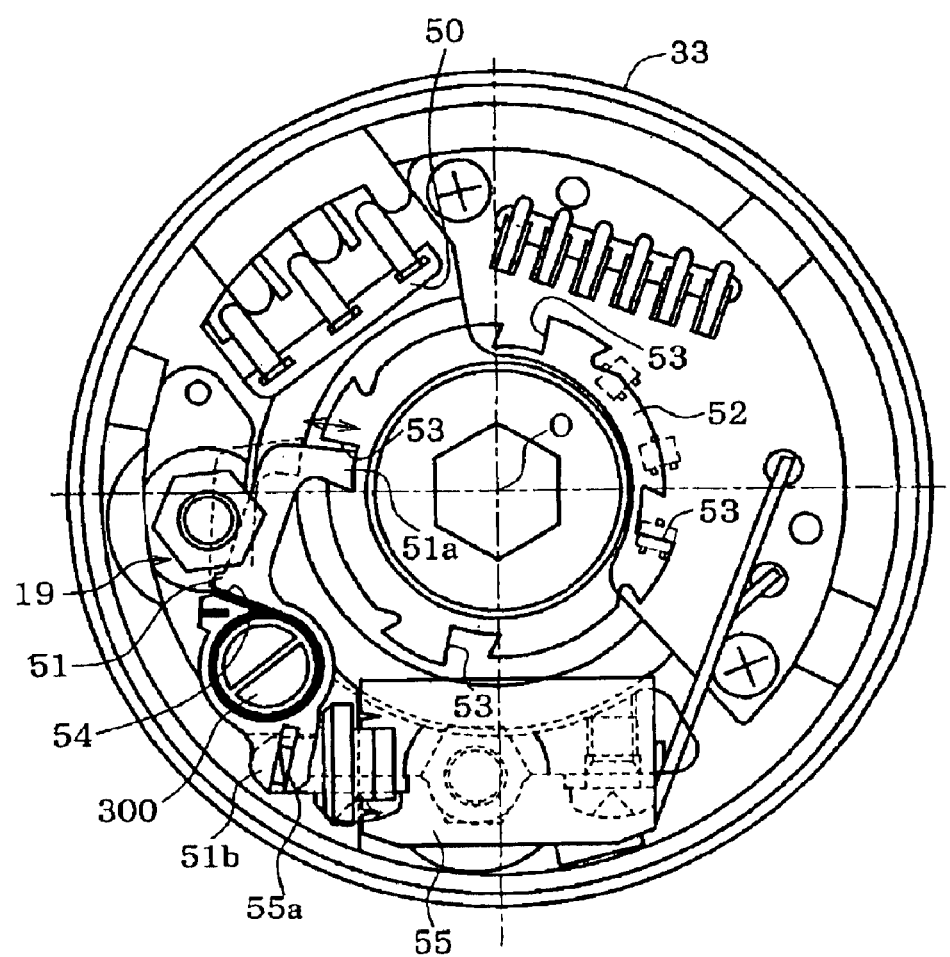
FIG. 3 is a cross sectional view of the driving unit taken along a line A—A in FIG. 2.

As seen in FIG. 3, the lock mechanism 19 includes a lock member 51 and a lock member receiving member 52. The lock member 51 is fixed to a lock base portion (i.e. the motor case 33) which is not rotatable relative to the steering wheel shaft 3. The lock member receiving member 62 is assembled at a lock member receiving base portion (at a side of the motor output shaft 36). As illustrated in FIG. 3, the lock member 51 is disposed so as to be movable to a locked position, at which the lock member 51 is engaged to a lock member receiving portion 53 defined at the lock member receiving member 52, and an unlocked position, at which the lock member 51 is retracted and released from the engaged condition to the lock member receiving portion 53.

According to the embodiment of the present invention, the lock member receiving member 52 possesses plural lock member receiving portions 53 defined in a circumferential direction of the lock member receiving member 52 at a predetermined interval therebetween. A lock portion 51*a* at a tip end of the lock member 51 can be engaged to the one of the plural lock member receiving portions 53 in response to a rotational angle phase of the vehicle wheel steering shaft 8. The steering wheel shaft 3 is coupled to the motor case 33 via the coupling 22 and the pins such that the steering wheel shaft 3 can not be rotated relative to the motor case 33. When the lock member 51 is not engaged to the lock member receiving member 52, the motor output shaft 36 rotate relative to the motor case 33. The rotation thereof is transmitted to the first internal gear 39 and the second internal gear 139 via the external gear 38, respectively. The first internal gear 39 fixed to the motor case 33 is not rotated relative to the external gear 38 such that the first internal gear 39 rotates at the substantially same rotational speed as the steering wheel shaft 3. That is, the first internal gear 39 rotates following the manual operation of the steering wheel 2. The rotational speed of the motor output shaft 36 is decelerated by the second internal gear 139 and is transmitted to the vehicle wheel steering shaft 8. Therefore, the second internal gear 139 acts for driving the vehicle wheel steering shaft 8 for its rotation. On the other hand, when the lock member 51 is engaged to the lock member receiving member 52, the motor output shaft 36 can not rotate relative to the motor case 33. The first internal gear 39 is fixed to the motor case 33, but the second internal gear is not. Therefore, the rotation of the steering wheel shaft 3 is directly transmitted to the vehicle wheel steering shaft 8 via the first internal gear 39, the external gear 38, and the second internal gear 139.

According to the embodiment of the present invention, the lock member receiving member 52 is assembled at the outer peripheral surface at one end of the motor output shaft 36. Each lock member receiving portion 63 is recessed in a radially inner direction of the lock member receiving member 52 from an outer peripheral surface thereof. As illustrated in FIG. 2, the lock member 51 is rotatably assembled on a rotation base 300 in a direction parallel to an axial direction of the vehicle wheel steering shaft 8. A rear end portion 51b of the lock member 51 is engaged with the rotation base 300. Disposed is also an elastic member 54 for elastically returning the lock member 51 at an initial position when a solenoid 65 is not electrically excited. The lock portion 51a of the lock member 51 is moved to be closer to or to be away from the lock member receiving member 52 via a convex portion 55a of the solenoid 55 and a groove defined at the rear end portion 51b of the lock member 51. When the solenoid 55 is electrically excited, the lock mechanism 19 can establish either the locked condition or the unlocked condition. According to the embodiment of the present invention, the lock mechanism 19 is designed to establish the unlocked condition when the solenoid 55 is electrically excited. Therefore, when the electrical excitation to the solenoid 55 is terminated at a time of power-off, the lock mechanism 19 establishes the locked condition by the elastic member 54 such that the manual steering operation can be performed.

Figure 4:
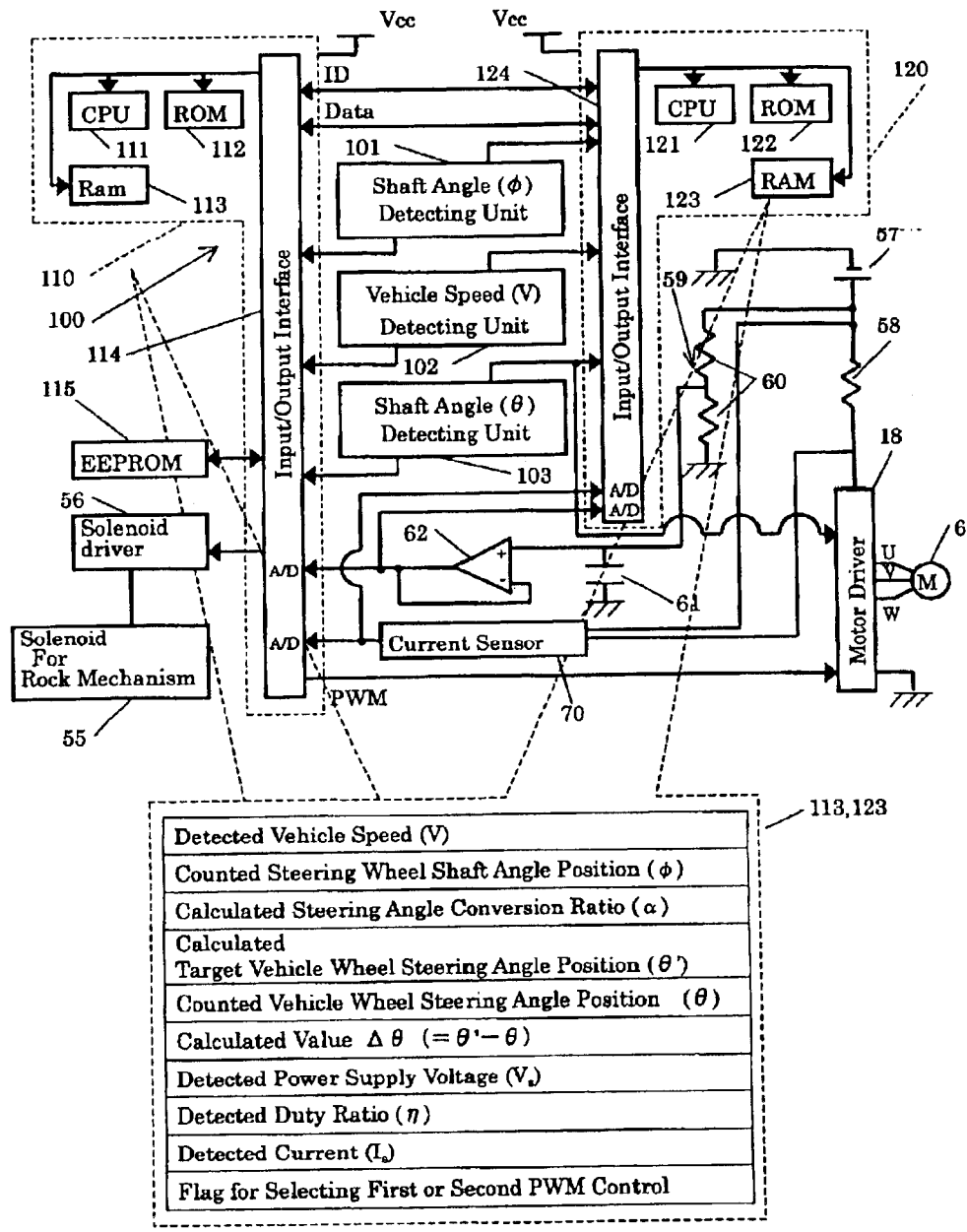
FIG. 4 is a block view illustrating an electrical structure of the vehicle steering control system according to the embodiment of the present invention.

As seen in FIG. 4, the steering control unit 100 according to the first embodiment of the present invention houses a main microcomputer 110 and an sub microcomputer 120. The main microcomputer 110 houses a main CPU 111, a ROM 112 storing a control program, a RAM 113 as a work area of the main CPU 111, and an input-output interface 114 (hereinafter, referred to as an I/O interface 114). The sub microcomputer 120 houses an sub CPU 121, a ROM 122 storing a control program, and a RAM 123 as a work area for the sub CPU 121, and an input-output interface 124 (hereinafter, referred to as an I/O interface 124). The main microcomputer 110 directly controls operation of the motor 6 (i.e. an actuator) for driving the vehicle wheel steering shaft 8 for its rotation. The sub microcomputer 120 also performs data processing required for controlling the operation of the motor 6 such as parameter calculation, as well as the main microcomputer 110. Further, the sub microcomputer 120 monitors and confirms whether or not the main microcomputer 110 has normally operated, based upon a result of data communication therebetween. Therefore, the sub microcomputer 120 can also act as an auxiliary control unit for supplement information as required. The data communication between the main microcomputer 110 and the sub microcomputer 120 are performed via the I/O interfaces 114 and 124. The memory being stored in the RAM 113, 123, or an EEPROM (described later) 115 can be stored as far as the microcomputers 110 and 120 are applied with power supply voltage Vcc (e.g. 5V) from a stabilized power source (not shown) even after turning off an ignition switch (not shown).

Each detection value by the steering wheel shaft angle detecting unit 101, the vehicle speed detecting unit 102, and the vehicle wheel steering shaft angle detecting unit 103 is distributably inputted to the I/O interface 114 of the main microcomputer 110 and the I/O interface 124 of the sub microcomputer 120. According to the embodiment of the present invention, each detecting unit is configured with a rotary encoder. A counting signal from each rotary encoder is directly inputted to a digital port of each I/O interface 114 and 124 via a schmitt trigger (not shown). The I/O interface 114 of the main microcomputer 110 is connected with the solenoid 55 acting as a driving unit of the lock mechanism 19 via a solenoid driver 56.

According to the embodiment of the present invention, the motor 6 is configured with a three-phase brushless motor and the rotational speed thereof can be adjusted by a pulse-width modulation control (hereinafter, referred to as a PWM control). Referring to FIG. 4, the motor driver 18 is connected with an in-vehicle battery 57 as a power source of the motor 6. A power supply voltage Vs of the battery 57 transmitted to the motor driver 18 varies (e.g. 9V to 14V) in accordance with load dispersed at each portion of the vehicle, a condition of an alternator which generates electric power, or the like. According to the embodiment of the present invention, the power supply voltage Vs is directly utilized as a motor power source voltage without a stabilized power source circuit. The steering control unit 100 controls the operation of the motor 6 on the assumption that the power supply voltage Vs, which critically varies as aforementioned, is utilized. Therefore, the steering control unit 100 further houses a detecting unit for detecting the power supply voltage Vs. According to the embodiment of the present invention, a pair of voltage dividers 60 as the detecting unit is provided in a passage branching from a portion immediately in front of the motor driver 18 on a current supply passage to the motor 6. Therefore, a voltage detection signal representing the power supply voltage Vs can be obtained via the pair of voltage dividers 60. The voltage detection signal is smoothed by a condenser 61 and is inputted to each inlet port with an A/D converting means (hereinafter, referred to as an A/D port) of each I/O interface 114 and 124.

Figure 6:
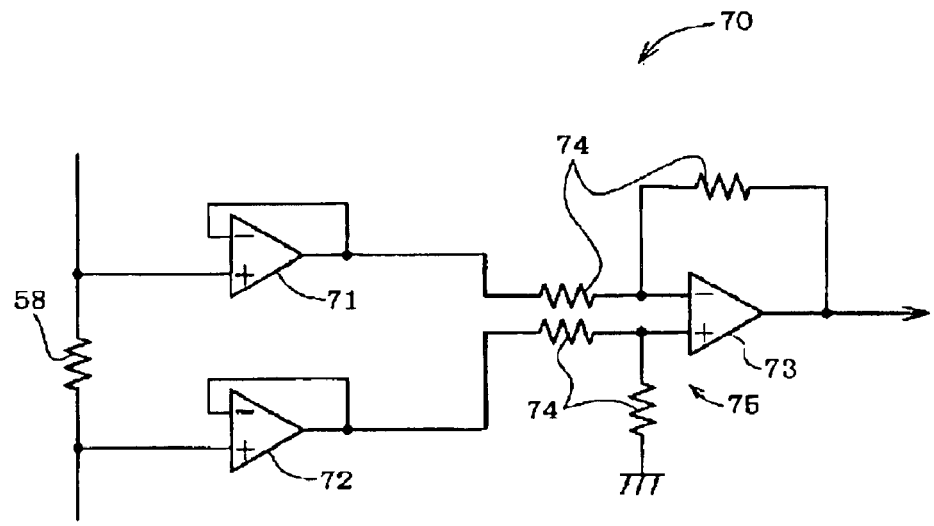
FIG. 6 is a view schematically illustrating a circuit of an electric current sensor illustrated in FIG. 4.

Provided further is an electric current detecting unit in the current supply passage to the motor 6 so as to monitor the condition of the electric current supply to the motor 6. More particularly, a shunt resistance (i.e. an electric current detecting resistance) 58 is mounted in the current supply passage to the motor 6. A voltage difference between both ends of the shunt resistance 58 is detected by an electric current sensor 70 (i.e. a current detecting means) and is inputted to the A/D port of each I/O interface 114 and 124. As illustrated in FIG. 6, in the electric current sensor 70, the voltage at the respective ends of the shunt resistance 58 are estimated by voltage followers 71 and 72 and the output based upon the voltage difference therebetween is amplified by a differential amplifier 75 including an operational amplifier 73 and resistors 74. The amplified voltage can be referred to as a current detection value $I_S$ which proportionally corresponds to a value of an electric current supplied to the shunt resistance 58. Alternatively, a Hall element or a current detecting coil can be utilized so as to detect the electric current based upon electromagnetic principles in substitution for the shunt resistance 58.

The current detection value $I_S$ outputted from the electric current sensor 70 is compared with a reference value $I_R$ by a comparator 104. When the current detection value $I_S$ is smaller than the reference value $I_R$, a first PWM control is applied to the motor 6. When the current detection value $I_S$ is greater than the reference value $I_R$, a second PWM control is applied to the motor 6. According to the embodiment of the present invention, the current detection value $I_S$ from the electric current sensor 70 is inputted to the comparator 104 via a branch passage from an output main passage of the electric current sensor 70. The comparator 104 outputs a binary signal based upon the comparison between the current detection value $I_S$ and the reference value $I_R$. The main microcomputer 110 sets a flag, for example at a value "1", for selecting the first PWM control when the current detection value $I_S$ is smaller than the reference value $I_R$. On the other hand, the main microcomputer 110 sets a flag, for example at a value "0", for selecting the second PWM control when the current detection value $I_S$ is greater than the reference value $I_R$. The comparator 104 is configured with an operational amplifier, in which a dead zone has been designed by a positive feedback resistance so as to prevent chattering. Alternatively, the compassion between the current detection value $I_S$ and the reference value $I_R$ can be performed by use of a software in the main microcomputer 110. In this case, the current detection value $I_S$ is directly inputted to the main microcomputer 110 and is compared with the reference value $I_R$. The flag is set based upon the comparison result in the same manner as described above. The dead zone can be defined by judging whether the current detection value $I_S$ at this time is greater than the current detection value $I_S$ at a previous time. Therefore, the dead zone can be defined by setting a threshold value during increase of the current detection value $I_S$ and a threshold value during decrease of the current detection value $I_S$ at different values, respectively.

As explained in FIG. 4, the RAM 113 for the main microcomputer 110 and the RAM 123 for the sub microcomputer 120 possess following memory areas, respectively:

(1) a vehicle speed V detection value memory for memorizing a detection value representing the current vehicle speed V detected by the vehicle speed sensor 102;

(2) a steering wheel shaft angle position $\phi$ counter memory for counting a counting signal outputted from the rotary encoder for the steering wheel shaft angle position detecting unit 101 and for memorizing the count representing a steering wheel shaft angle position $\phi$, the rotary encoder capable of recognizing a rotational direction of the steering wheel shaft 3, incrementing the count at a time of a forward rotation thereof, and decrementing the count at a time of a reverse rotation thereof;

(3) a steering angle conversion ratio $\alpha$ calculated value memory for memorizing the steering angle conversion ratio $\alpha$ calculated based upon the vehicle speed V detection value;

(4) a target vehicle wheel steering shaft angle position $\theta'$ calculated value memory for memorizing a target vehicle wheel steering shaft angle position $\theta'$, i.e. a target value of the vehicle wheel steering shaft angle position, the target vehicle wheel steering shaft angle position $\theta$ calculated bared upon the current steering wheel shaft angle position $\phi$ and the steering angle converting ratio $\alpha$, and expressed for example in accordance with the following formula: $\phi*\alpha$;

(5) the vehicle wheel steering shaft angle position $\theta$ counter memory for counting a counting signal from the rotary encoder for the vehicle wheel steering shaft angle detecting unit 103 and for memorizing the count representing a current vehicle wheel steering shaft angle position $\theta$;

(6) a $\Delta\theta$ value memory for memorizing a calculated value representing an angle deviation of the current vehicle wheel steering shaft angle position $\theta$ from the target vehicle wheel steering shaft angle position $\theta'$, and the angle deviation expressed in accordance with the following equation: $\Delta\theta$ (=$\theta'-\theta$);

(7) a power supply voltage Vs detection value memory for memorizing a detection value representing the power supply voltage Vs for the motor 6;

(8) a duty ratio $\eta$ detection value memory for memorizing a duty ratio $\eta$ determined based upon the angle deviation $\Delta\theta$ and the power supply voltage Vs so as to apply the PWM control to the motor 6;

(9) a current detection value $I_S$ memory for memorizing a detection value representing an electric current $I_S$ detected by the electric current sensor 70; and

(10) the aforementioned flag for selecting the first PWM control or the second PWM control.

The main microcomputer 110 includes the following means which is activated by the control program stored in the ROM 112:

(1) a PWM control selecting means for selecting the first or second PWM controls with reference to the set value of the flag for selecting the PWM control; and (2) a motor operation limiting means for stopping the operation of the motor 6 by changing the electric current supplied to the solenoid 55 for the lock mechanism 19 and by locking the steering wheel shaft 3 and the vehicle wheel steering shaft 8 when the electric current sensor 70 monitors abnormality of the motor 6 (i.e. a lock controlling means).

The sub microcomputer 120 performs the above by the control program stored in the ROM 122 for monitoring the main microcomputer 110. According to the motor operation limiting means, the electric current being supplied to the motor 6 is appropriately limited when the electric current sensor 70 detects the overcurrent to the motor 6. In this case, the motor temperature can be effectively restrained from increasing excessively, thereby enabling to improve a motor operating time.

The EEPROM 115 (i.e. a second memorizing unit) is connected to the I/O interface 114 for the main microcomputer 110 for memorizing the vehicle wheel steering shaft angle position $\theta$ at a time of terminating of the operation, i.e. at a time of turning off of an ignition switch (not shown). Hereinafter, the vehicle wheel steering shaft angle position $\theta$ under this condition is referred to as a final vehicle wheel steering shaft angle position. When the CPU 111 for the main microcomputer 110 has been applied with a first operation voltage (+5V), the CPU 111 only can read out the date stored in the RAM 113. When the CPU 111 has been applied with a second operation voltage, the CPU 111 can write date into the RAM 113. According to the embodiment of the present invention, the second operation voltage is designed to be higher than the first operation voltage, such as +7V. Therefore, the data in the RAM 113 is not transcribed in error such as when the CPU 111 runs away. The second operation voltage can be generated by a voltage increase circuit which is not shown and is defined between the EEPROM 115 and the I/O interface 114.

Next, the following description will be given for explaining operation of the vehicle steering control system 1 illustrated in FIG. 1.

Figure 12:
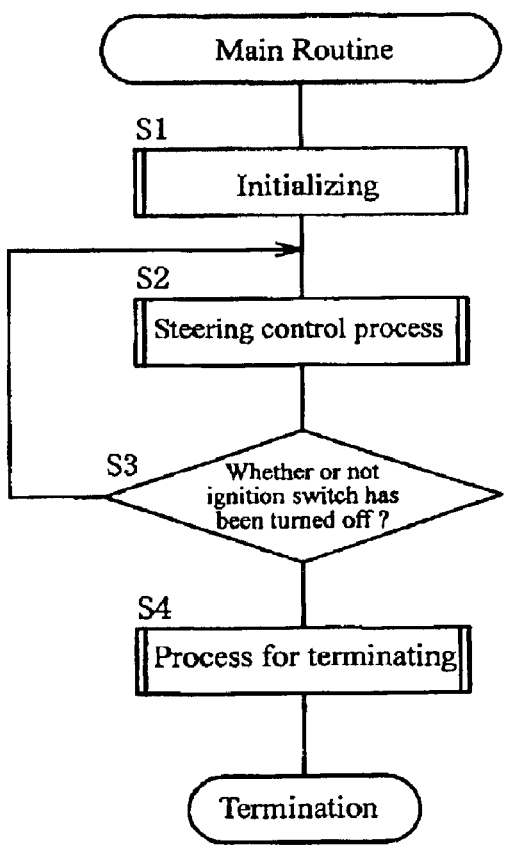
FIG. 12 illustrates a flowchart for explaining a main routine of a computer process by the vehicle steering control system according to the embodiment of the present invention.

As explained by a flowchart illustrated in FIG. 12, the CPU 111 for the main microcomputer 110 first starts a main routine of the control program at step S1 for initializing. At step S1, the CPU 111 reads out the final vehicle wheel steering shaft angle position which was stored in the EEPROM 115 at the time of the previous turning off operation of the ignition switch. Further at step S1, the CPU 111 sets the final vehicle wheel steering shaft angle position as an initial vehicle wheel steering shaft angle position for starting the main routine. More particularly, a count representing the final angle position is set in the vehicle wheel steering shaft angle position θ counter memory described above. A data writing termination flag for the EEPROM 115 is cleared at this point.

Figures 9, 10:
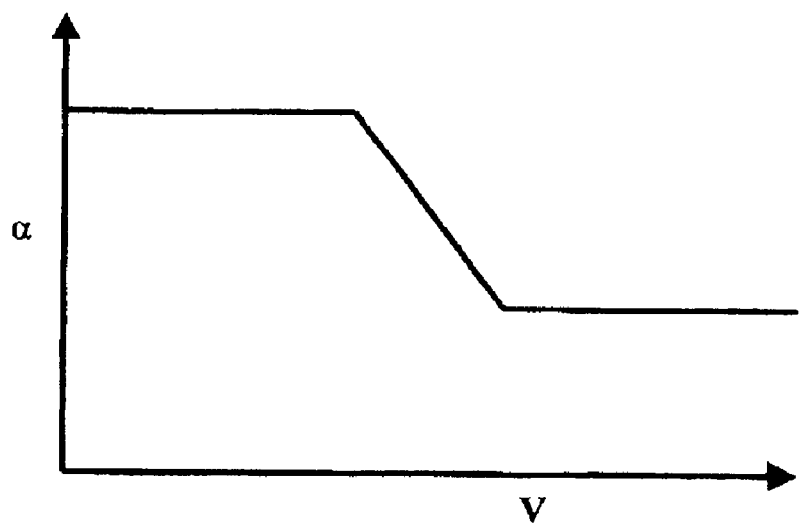
FIG. 9 is a table explaining a relationship between a steering angle conversion ratio and a vehicle speed according to the embodiment of the present invention.
FIG. 10 is a graph schematically illustrating one of examples for setting the steering angle conversion ratio in response to a vehicle speed according to the embodiment of the present invention.
Figure 13:
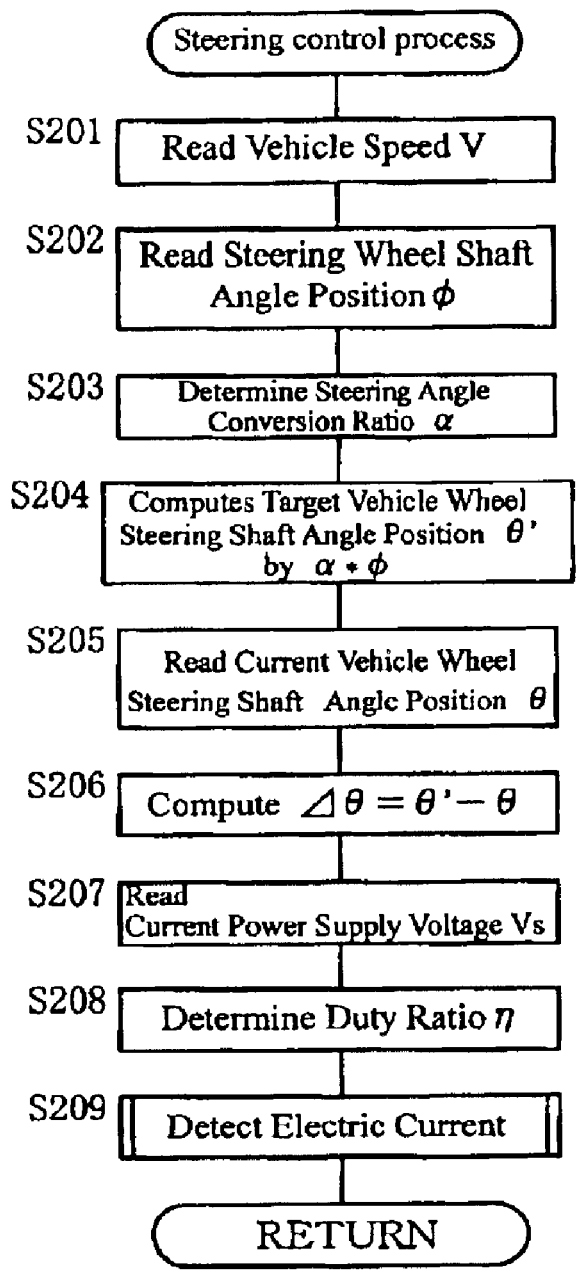
FIG. 13 illustrates a flowchart for explaining details of a steering control process performed in the main routine.

The CPU 111 then proceeds to step S2 for performing a steering control process. The steering control process at step S2 is repeatedly performed at a predetermined period of time basis (e.g. several hundred μs) so as to uniformize an interval for sampling parameters. Details of the steering control process are described below with reference to a flowchart illustrated in FIG. 13. At step S201, the CPU 111 reads out the detection value representing the current vehicle speed V. AT step S202, the CPU 111 reads out the steering wheel shaft angle position φ. At step S203, the CPU 111 reads out determines the steering angle conversion ratio α for converting the steering wheel shaft angle position φ to the target vehicle wheel steering shaft angle position θ', with reference to the detection value representing the vehicle speed V. That is, the steering angle conversion ratio α varies in accordance with the vehicle speed V. More particularly, as illustrated in FIG. 10, when the vehicle speed V is detected to be greater than a predetermined speed value, the steering angle conversion ratio α is set to be relatively small. On the other hand, when the vehicle speed V is detected to be smaller than the predetermined speed value, the steering angle conversion ratio α is set to be relatively large. According to the embodiment of the present invention, the steering control unit 100 houses a table 130 illustrated in FIG. 9 in the ROM 112 (the ROM 122) for defining a setting value of the steering angle conversion ratio α corresponding to each vehicle speed V. The steering angle conversion ratio α corresponding to the current vehicle speed V hence can be computed by interpolation with reference to the table 130.

As described above, according to the embodiment of the present invention, the vehicle speed V is referred to as information representing the vehicle driving condition. Alternatively, vehicle lateral load or an angle of a slope road can be referred to as the information representing the vehicle driving condition. The steering angle conversion ratio α can be set corresponding to a value of the vehicle lateral load detected by a sensor. Still alternatively, a reference value of the steering angle conversion ratio α can be determined corresponding to the vehicle speed V. The reference value thereof is corrected as needed based upon information apart from the vehicle speed.

At step S204, the CPU 111 computes the target vehicle wheel steering shaft angle position θ' by multiplying the steering wheel shaft angle position φ with the determined steering angle conversion ratio α. At step 205, the CPU 111 reads out the current vehicle wheel steering shaft angle position θ. At step 206, the CPU 111 computes the angle deviation Δθ of the current vehicle wheel steering shaft angle position θ from the target vehicle wheel steering shaft angle position θ'. At step 207, the CPU 111 reads out the current power supply voltage Vs.

The motor 6 drives the vehicle wheel steering shaft 8 for its rotation so as to reduce or cancel the angle deviation Δθ. When the Δθ is relatively large, the rotational speed of the motor 6 is speeded up. On the other hand, when the Δθ is relatively small, the rotational speed of the motor 6 is slow downed. Therefore, the current vehicle wheel steering shaft angle position θ can be rapidly and smoothly approximated to the target vehicle wheel steering shaft angle position θ'. As a fundamental idea of the present invention, the motor 6 is applied with a proportional control based upon the angle deviation Δθ as a parameter. However, it is more preferable that the motor 6 be applied with a known proportional-integral-differential control (hereinafter, referred to as a PID control) in consideration of integrating or differentiating of the angle deviation Δθ, thereby enabling to stabilize the motor operation control.

As described above, the motor 6 has been applied with the PWM control and the rotational speed thereof can be adjusted by changing the duty ratio η. If the power supply voltage Vs is constant, the rotational speed of the motor 6 can be adjusted in accordance with the duty ratio η. However, according to the embodiment of the present invention, the power supply voltage Vs is not constant. Therefore, the duty ratio η is required to be determined in consideration of the power supply voltage Vs. For example, as illustrated in FIG. 11, the ROM 112 (the ROM 122) respectively stores a two-dimensional duty ratio converting table 131 for obtaining the duty ratio η corresponding to each combination of the power supply voltage Vs and the angle deviation Δθ. Further, the rotational speed of the motor 6 varies due to load as well. In this case, the motor load can be estimated based upon the detection value representing the current $I_S$ by the electric current sensor 70. The duty ratio η can be hence corrected based upon the estimated motor load.

At step S209, the CPU 111 performs an electric current detecting process. More particularly, the CPU 111 reads out the current detection value $I_S$ for the motor 6 from the electric current sensor 70. When the current detection value $I_S$ exceeds a predetermined value, the CPU 111 judges the motor 6 has been supplied with excess electric current. In this case, the steering wheel shaft 3 and the vehicle wheel steering shaft 8 are locked via the lock mechanism 19 such that the rotation of the motor 6 stops. For example, when the current detection value $I_S$ is judged to have been greater than the predetermined value over a predetermined time period, the CPU III judges the motor 6 has been supplied with excess electric current such that the lock mechanism 19 operates to establish the locked condition. Further, when the CPU 111 judges that the overcurrent to the motor 6 has disappeared, the lock mechanism 19 operates to establish the unlocked condition.

The above-described process is performed not only by the main microcomputer 110 but also by the sub microcomputer 120. More particularly, the sub microcomputer 120 monitors whether or not the main microcomputer 110 has malfunctioned. That is, the calculation result for each parameter stored in the RAM 113 of the main microcomputer 110 is transferred to the sub microcomputer 120 as needed. In the sub microcomputer 120, the transferred calculation result is then cross-checked with the information stored in the RAM

123 thereof so as to monitor the condition of the main microcomputer 110. In the meantime, the main microcomputer 110 generates the PWM signal based upon the determined duty ratio η. The main microcomputer 110 then outputs the PWM signal to the motor driver 18 for controlling an FET (illustrated in FIG. 7) capable of switching the stator coil to be electrically excited with reference to a signal from the rotary encoder of the vehicle wheel steering shaft angle detecting unit 103 such that the motor 6 is applied with the PWM control.

Going back to the main routine with reference to the flowchart illustrated in FIG. 12, at step S3, the CPU 111 judges whether or not the ignition switch has been turned off. When the ignition switch has been turned off, an affirmative judgment (YES) is obtained at step S3. Therefore, the CPU 111 proceeds to step S4 for performing a process for terminating the main routine. That is, the turn-off of the ignition switch means that the vehicle driving was terminated. At this point, the main microcomputer 110 reads out the final vehicle wheel steering shaft angle position being stored in the vehicle wheel steering shaft angle position counter memory. The final vehicle wheel steering shaft angle position is stored in the EEPROM 115 and the data writing termination flag is set.

Figure 5:
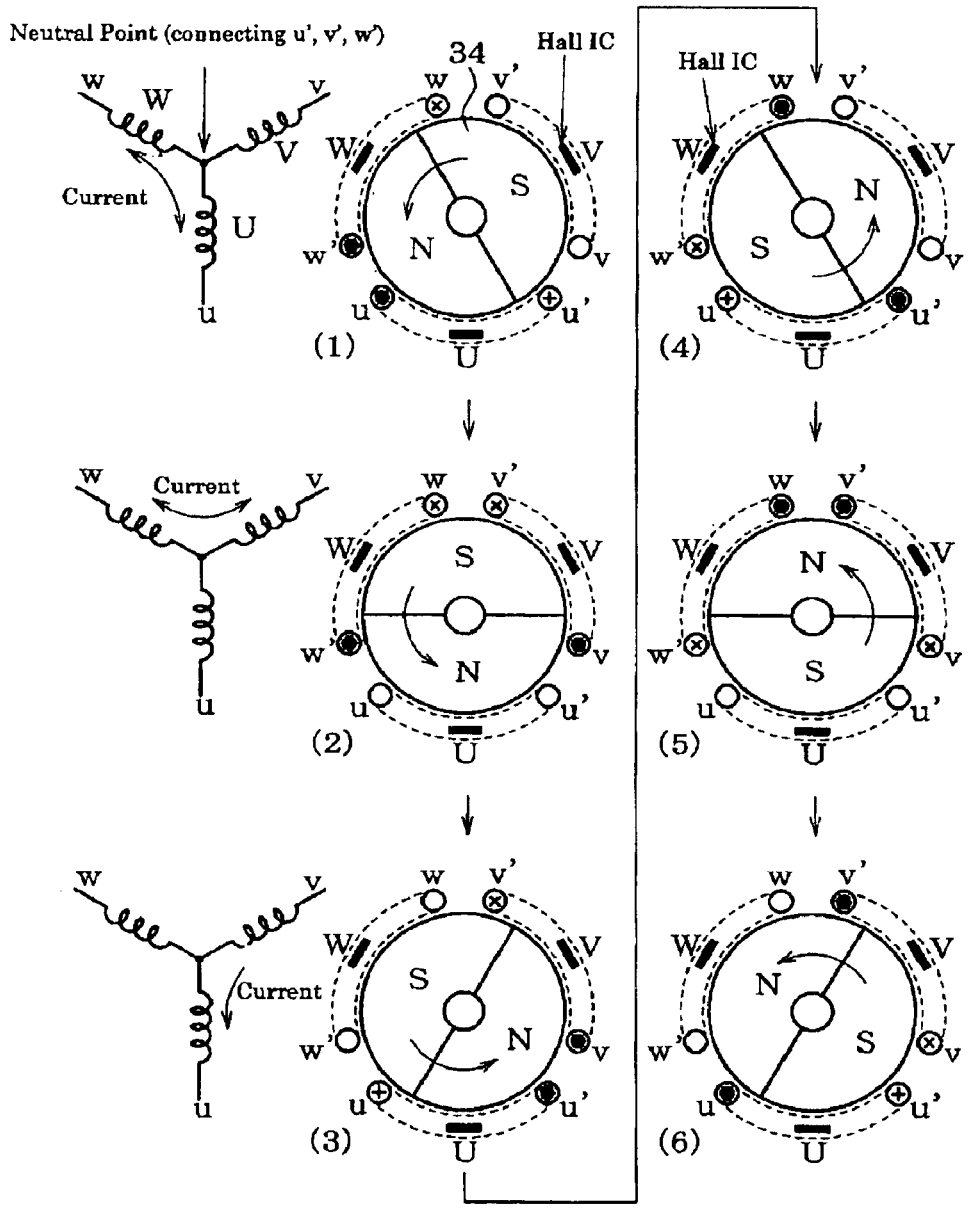
FIG. 5 is an explanatory view for explaining operation of a three-phase brushless motor according to the embodiment of the present invention.
Figure 8:
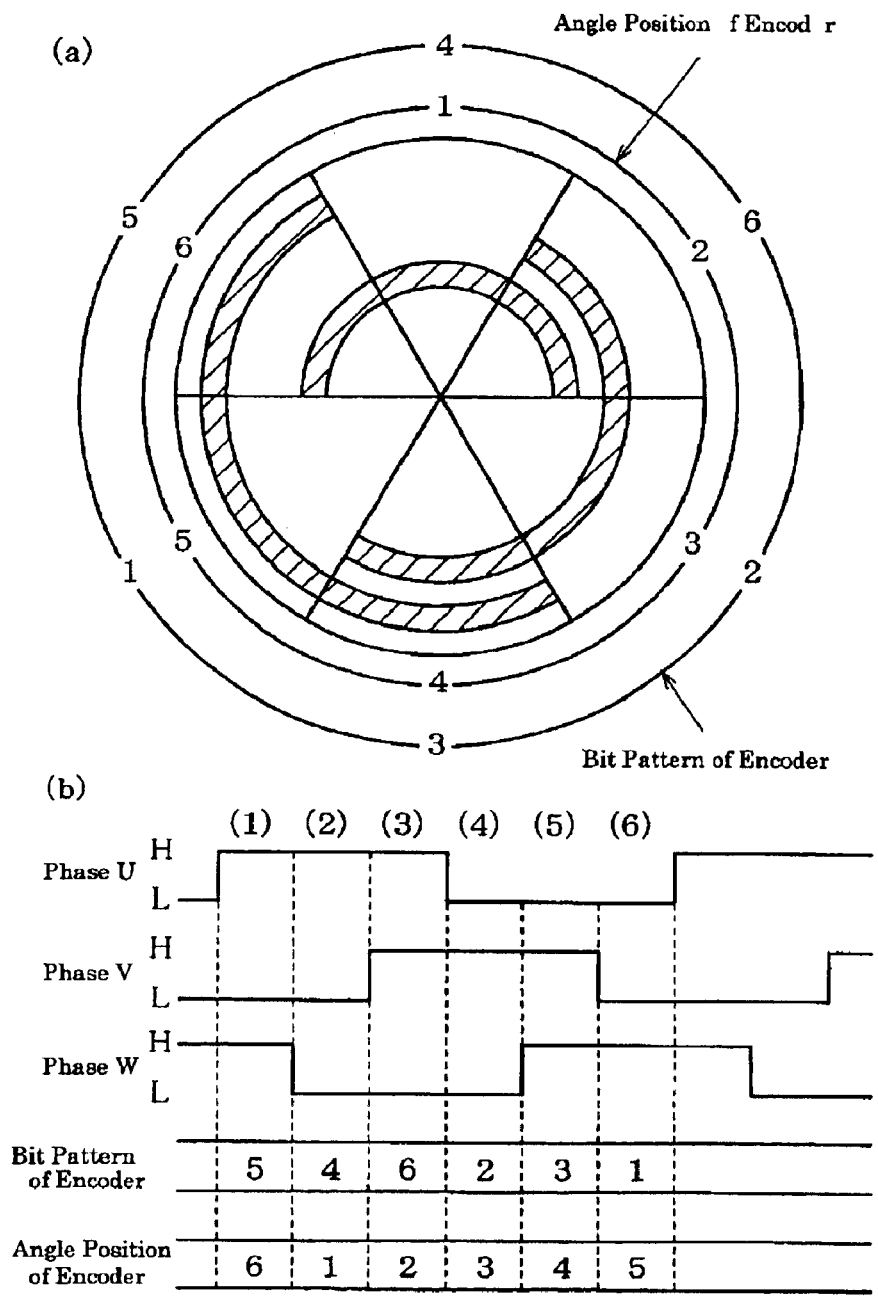
FIG. 8(a) is a diagram schematically illustrating a rotary encoder for describing a bit pattern for specifying a stator coil to be electrically excited.
FIG. 8(b) is an explanatory view for explaining a control sequence for electrically exciting each stator coil during rotation in a forward direction.

Next, the following description will be given for explaining the PWM control for the motor 6 according to the embodiment of the present invention. As described above, the three-phase brushless motor is applied for the motor 6. Referring to FIG. 5, the Hall IC as an angle sensor disposed in the motor 6 detects an angle of the armature 34 integrated with the motor output shaft 36 relative to each stator coil U, V, W forming a star connected circuit at a 120 electrical degrees apart from each other. The motor driver 18 cyclically switches power distribution to each stator coil U, V, and W in accordance with a sequence control for switching such as (1) the phase W to the phase U, (3) the phase U to the phase V, and (5) the phase V to the phase W. This control sequence is selected when the motor 6 rotates in the forward direction. When the motor 6 rotates in the reverse direction, the motor driver 18 cyclically switches the power distribution in a reverse order. In FIG. 8(*b*), a letter "H" denotes an energized state and a letter "L" denotes a de-energized state. When the motor 6 rotates in the reverse direction, the control sequence illustrated in FIG. 8(*b*) is defined with the encoder bit pattern reversed left and right and the encoder angle position reversed left and right. Parenthetical reference numerals in FIG. 8(*b*) denotes an angle position of the armature 34 illustrated in FIG. 5.

Figure 7:
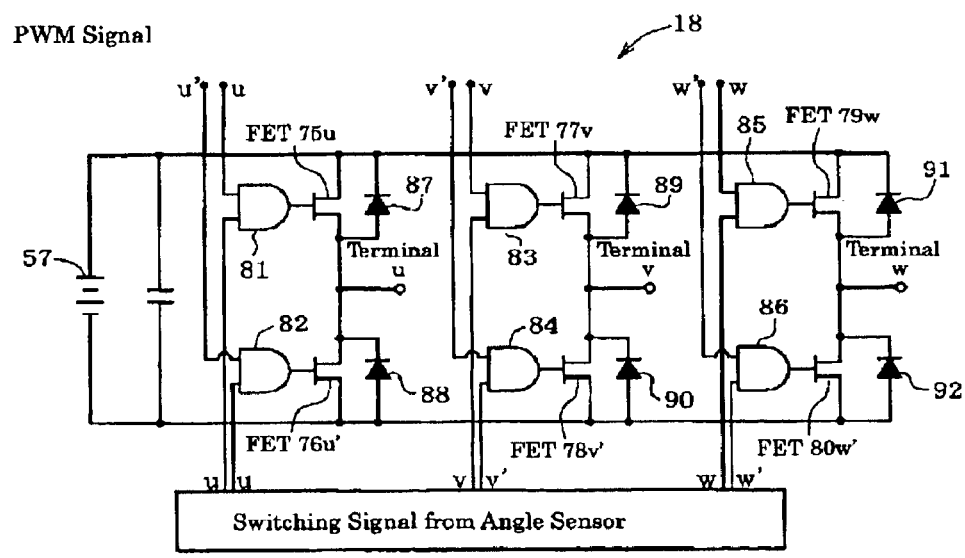
FIG. 7 is a circuit diagram illustrating a driver for driving the three-phase brushless motor.

Again with reference to FIG. 4, the rotation of the motor 6 is controlled in a state where a duty ratio control sequence by the PWM signal from the main microcomputer 110 has been superposed on the control sequence for switching power supply to each stator coil U, V, W. As illustrated in FIG. 7, the drive circuit of the motor driver 18 includes six FETs (i.e. semiconductor switching elements) 75*u* and 76*u*' for the stator coil U, 77*v* and 78*v*' for the stator coil V, and 79*w* and 80*w*' for the stator coil W. These six FETs 75*u*, 76*u*', 77*v*, 78*v*', 79*w*, and 80*w*' configures a known H bridge circuit. The drive circuit of the motor driver 18 further includes flywheel diodes 87, 88, 89, 90, 91, and 91 for defining bypass passes for induced current in accordance to switching operation of the stator coils U, V, W. The drive circuit of the motor driver 18 still further includes AND gates 81 and 82 for the FETs 75*u* and 76', AND gates 83 and 84 for the FETs 77*v* and 78*v*', and AND gates 85 and 86 for the FETs 79*w* and 80*w*'. Each AND gate generates a logical multiplication signal based upon a switching signal from the Hall IC (i.e. the angle sensor) and the PWM signal from the steering control unit 100. Therefore, each stator coil to be electrically excited can be selectively supplied with electric current in accordance with the PWM control by driving the FETs 75*u* to 80*w*' by the switching operation.

The timing for supplying the PWM signal to each FET can be determined in response to distribution of the switching signal from the Hall IC to the steering control unit 100. However, according to the embodiment of the present invention, the rotary encoder is employed so as to estimate the timing for supplying the PWM signal to each FET by the steering control unit 100. As described above, the rotary encoder detects the rotational angle of the motor output shaft 36. The detection value representing the motor output shaft rotational angle uniquely corresponds to the angle position of the vehicle wheel steering shaft 8 after speed reduction. Therefore, this rotary encoder is employed as the vehicle wheel steering shaft angle detecting unit 103.

FIG. 8(*a*) is a diagram schematically illustrating the rotary encoder. A bit pattern for specifying a stator coil electrically exciting pattern is described so as to control the sequence for electrically exciting the brushless motor. The bit pattern is defined at a constant angle interval in a circumferential direction of a disc. According to the embodiment of the present invention, the three-phase brushless motor is applied for the motor 6. Therefore, the six kinds of bit patterns are defined depending on the excitation patterns (1) through (6) at a 60 electrical degrees apart in the circumferential direction thereof such that the control sequence for electrically exciting the stator coils U, V, and W illustrated in FIG. 8(*b*) can be obtained. When the armature 34 of the motor 6 rotates, the rotary encoder synchronously rotatable with the armature 34 outputs the bid pattern for specifying the stator coil to be electrically excited at the present time. Therefore, the steering control unit 100 can determine to which FET the PWM signal should be transmitted, based upon the bit pattern. Further, according to the embodiment of the present invention, a wave length of the PWM waveform is preset, for example somewhere around 50 μs.

The rotation of the motor output shaft 36 is speed reduced and is then transmitted to the vehicle wheel steering shaft 8. Therefore, the rotary encoder counts plural rotations of the motor output shaft 36 while the vehicle wheel steering shaft 8 rotates at a 360-degree roll. In this case, an absolute angle position of the vehicle wheel steering shaft 8 may not be estimated based upon the bit pattern denoting only an absolute angle position of the motor output shaft 36. Therefore, as illustrated in FIG. 4, the RAM 113 (123) houses the vehicle wheel steering shaft angle position θ counter memory for memorizing the count representing the detected number of the bit pattern change so as to determine the vehicle wheel steering shaft angle position θ. Therefore, the vehicle wheel steering shaft angle detecting unit 103 can be estimated corresponding to an incremental-type rotary encoder. The absolute angle position of the motor output shaft 36 can be estimated based upon the bit pattern. Therefore, the rotational direction of the motor output shaft 36, i.e. the rotational direction of the vehicle wheel steering shaft 8 can be estimated by monitoring an order of the bit pattern change. The rotational direction thereof corresponds to the operational direction of the steering wheel 2. Therefore, when the vehicle wheel steering shaft 8 rotate in the forward direction, the count memorized in the vehicle wheel steering shaft angle position θ counter memory is incremented. On the other hand, when the vehicle wheel steering shaft 8 rotates in the reverse direction, the count memorized therein is decremented.

Figure 14:
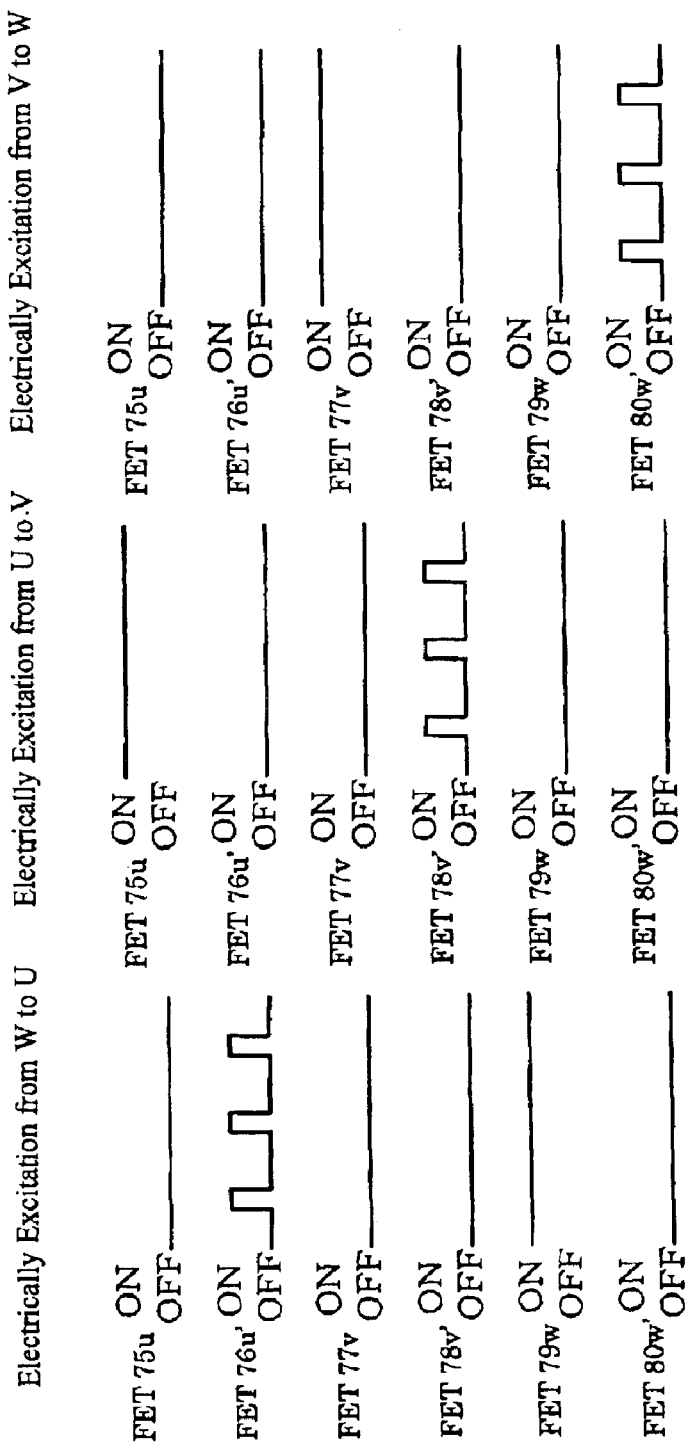
FIG. 14 is a time chart illustrating a first PWM control for the motor.
Figure 15:
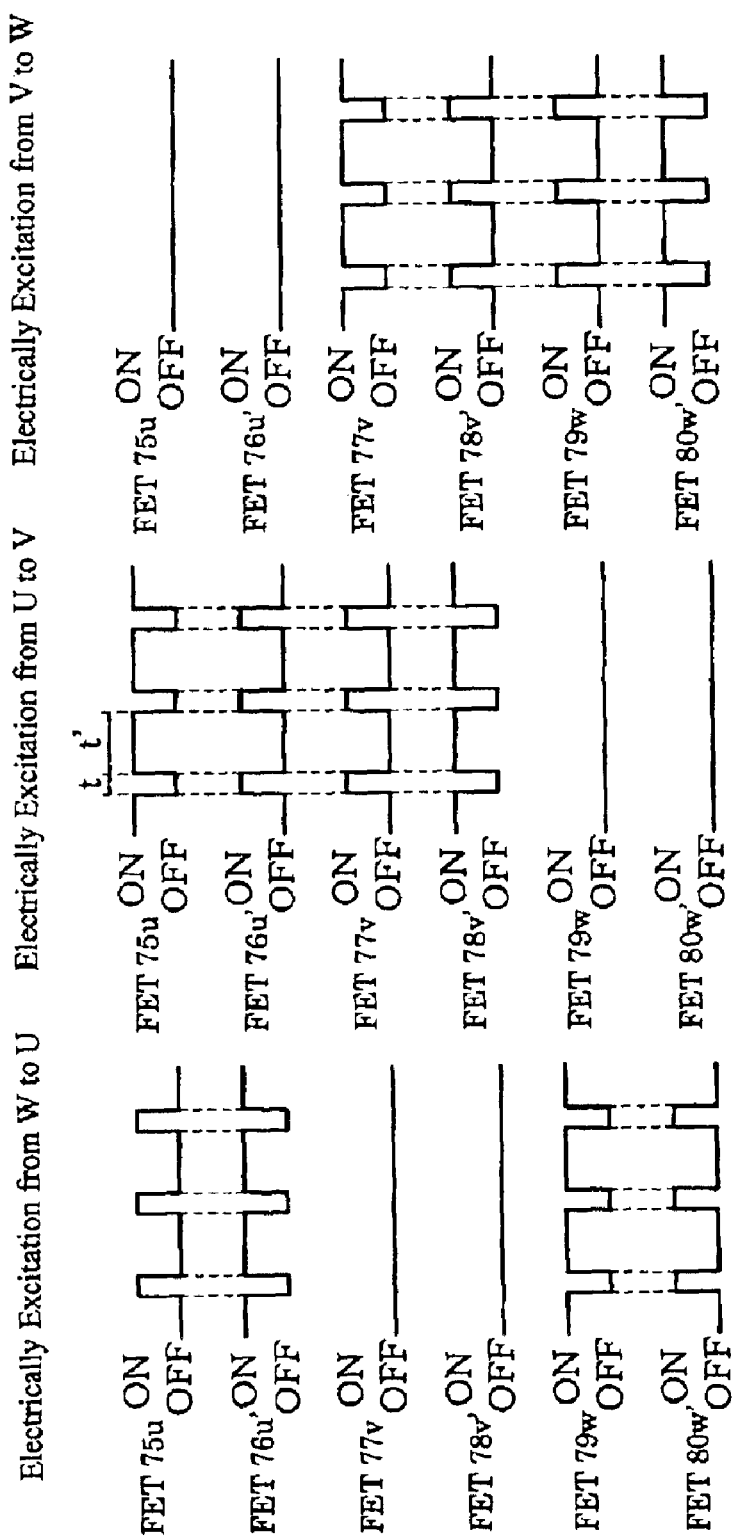
FIG. 15 is a time chart illustrating a second PWM control for the motor.
Figure 16:
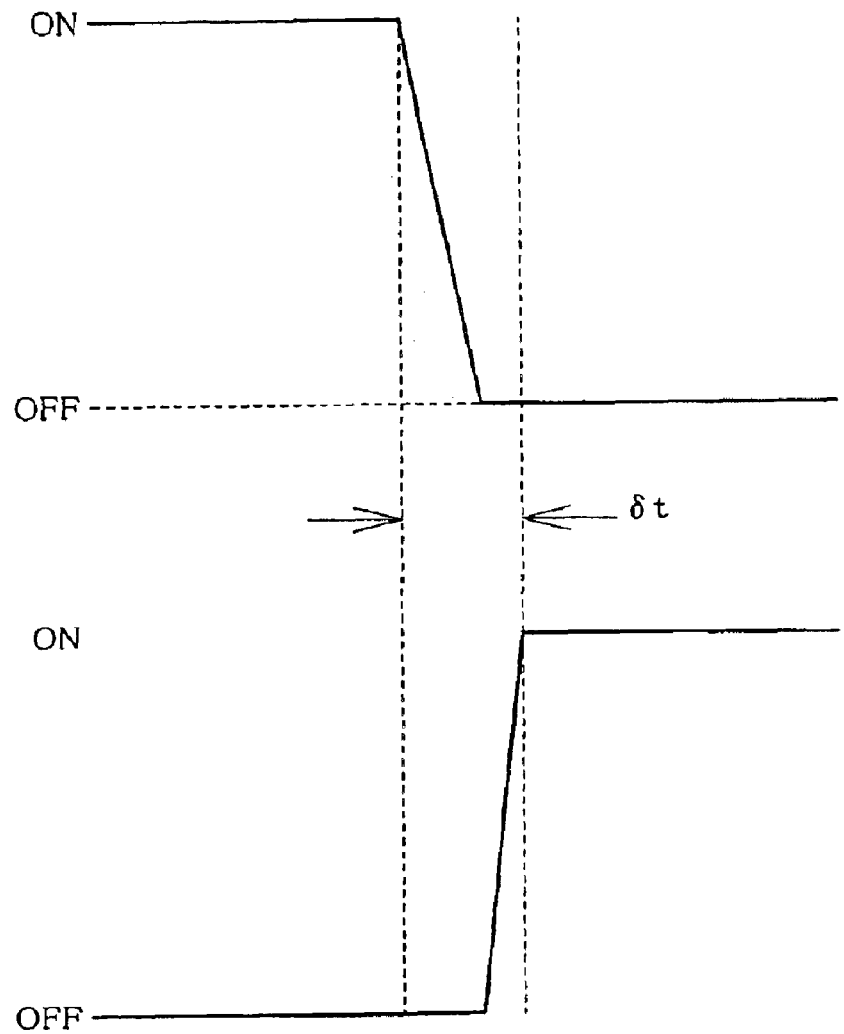
FIG. 16 is a graph explaining the reason of occurrence of a dead time by the second PWM control.

The PWM control according to the embodiment of the present invention is configured with the first PWM control and the second PWM control, and the PWM control is, at any time, changed in accordance with the set value of the flag for selecting the PWM control. When the first driving condition, in which the current detection value $I_S$ is smaller than the reference value $I_R$, is estimated, i.e. when the motor 6 rotates with relatively small load, the first PWM control illustrated in FIG. 14 is selected. On the other hand, when the second driving condition, in which the current detection value $I_S$ is greater than the reference value $I_R$, is estimated, i.e. when the motor 6 rotates with relatively large load, the second PWM control illustrated in FIG. 15 is selected. The second driving condition may be established especially when the steering wheel 2 is operated at a large operational angle.

As described above, the stator coils U, V, and W form a three-phase bridge configuration in which an end of each stator coil U, V, and W is connected at a neutral point together and the other end thereof is a power supply terminal. According to the embodiment of the present invention, two stator coils out of the three stator coils U, V, and W are electrically excited. For example, when the electric current is supplied from the stator coil U to the stator coil V, the H-bridged circuit illustrated in FIG. 7 can be designed with any of the following two types of likely power source connected polarities; the first power source connected polarity is provided with a first power supply terminal u for the stator coil U connected to a positive pole (i.e. a first pole) of the battery 57 (i.e. the direct current power source) and a second power supply terminal v for the stator coil V connected to a negative pole (i.e. a second pole) thereof, and the second power source connected polarity is provided with the first power supply terminal u for the stator coil U connected to the negative pole (i.e. the second pole) and the second power supply terminal v for the stator coil V connected to the positive pole (i.e. the first pole). When the H-bridged circuit illustrated in FIG. 7 is designed with the first power source connected polarity, the FETs 75$u$ and 78$v'$ are closed to be turned on. On the other hand, when the H-bridged circuit illustrated in FIG. 7 is designed with the second power source connected polarity, the FETs 76$u'$ and 77$v$ are closed to be turned on.

In the first PWM control illustrated in FIG. 14, a first power supply terminal (e.g. the terminal u) of one of the two stator coils of the three-phase brushless motor is connected to a first pole (e.g. a positive pole) of the battery (i.e. the direct current power source) 57 and is not applied with switching operation, and a second power supply terminal (e.g. the terminal v) of the other one of the two stator coils thereof is connected to a second pole (e.g. a negative pole) of the battery 57 and is turned on and off by the switching operation. Further, in the first PWM control, the voltage is designed to be constant to one of the polarities all the time. The connection to the negative pole is conceptionally assumed to be equal to earth connection. The switching operation can be performed in accordance with the duty ratio η determined described above. For example, according to a time chart regarding an electrically excitation from the stator coil U to the stator coil V illustrated in FIG. 14, the FET 75$u$ for the stator coil U is consecutively turned on and the FET 78$v'$ for the stator coil V is turned on and off by the switching operation. When the stator coils to be electrically excited are switched in a sequential order as illustrated in FIG. 14, the FET to be turned on and off by the switching operation is selected corresponding to each coil stator, thereby performing the switching operation in the same manner.

As described above, according to the first PWM control of the present invention, a dead time is not caused during the switching operation such that the rotational speed of the motor 6 can be controlled with a good linearity by the first PWM control even while the motor 6 has rotated at a relatively low load such a small duty ratio η. Therefore, the first PWM control is preferable when the vehicle wheel steering shaft angle position is approximated to the target angle position or when the steering wheel 2 is operated at a slow speed. Further, the motor 6 can be prevented from vibrating. However, the motor 6 may be easily influenced by flywheel electric current along with the switching operation when the electric current is detected by the electric current sensor 70. Accordingly, the first PWM control may not be preferable while the motor 6 has rotated with a relatively large load such as a large electric current. The foregoing explanation can be easily proved by calculation. For example, when the electric power is supplied from the stator coil U to the stator coil V, a terminal voltage for each phase is denoted with Vu, Vv, and Vw, and a power supply voltage is denoted with Vs. The stator coil U is always electrically excited such that the terminal voltage for the phase U can be expressed in this formula: Vu=Vs. The phase V is turned on and off by the switching operation in accordance with the duty ratio η such that the terminal voltage Vv is connected to a ground electrode when the V phase is electrically excited and becomes equal to the power supply voltage Vs when it is not electrically excited. Therefore, the average value of the terminal voltage Vv can be expressed in accordance with the following formula:

$$Vv=(1-\eta)Vs.$$

One end of the phase W is connected to the phases U and V so as to configure a star connected circuit and the other end thereof is always open. Therefore, the terminal voltage Vw becomes substantially equal to the averaged value of the terminal voltages Vu and Vv. Namely, the terminal voltage Vw is expressed in accordance with the following formula:

$$Vw=(Vu+Vv)/2.$$

Although the current detection value $I_S$ detected by the electric current sensor 70 is reflected with the averaged terminal voltage of the three phases, the value of the current detection value $I_S$ is expressed in accordance with the following formula:

$$I_S=(3/2)Vs*(2-\eta).$$

Therefore, even if the power supply voltage Vs is always applied at a constant voltage value, the above formula shows that the terminal voltage of the motor 6 itself varies depending on the duty ratio η for the switching operation, which is caused due to the flywheel current described above. However, the aforementioned matter does not become an issue when the duty ratio η is relatively small and when the motor 6 rotates with the relatively low load.

In the second PWM control illustrated in FIG. 15, the power source connecting polarity of the H-bridged circuit illustrated in FIG. 7 is designed by switching a first connected condition and a second connected condition. In the first connected condition of the H-bridged circuit illustrated in FIG. 7, the first power supply terminal (e.g. the terminal u) of the one of the two stator coils of the three-phase brushless motor is connected to the first pole (e.g. the positive pole) of the battery 57 and the second power supply terminal (e.g. the terminal v) of the other one of the two stator coils thereof is connected to the second pole (e.g. the negative pole) of the battery 57. In the second connected condition of the H-bridged circuit illustrated in FIG. 7, the first power supply terminal is connected to the second pole and the second power supply terminal is connected to the first pole. Namely, the second connected condition possesses an inverted polarity of the polarity of the first connected condition. The second PWM control is similar to a square-wave alternating current excitation. A ratio of a positive half-wave period of an impressed voltage waveform and a negative half-wave period thereof is adjusted based upon the duty ratio. An averaged voltage for driving the motor 6 is computed depending on a difference therebetween. For example, according to a time chart regarding the electrically excitation from the stator coil U to the stator coil V illustrated in FIG. 15, the FETs 77v and 76u' are turned on and the FETs 78v' and 75u are turned off when the H-bridged circuit is designed with the first connected condition. On the other hand, when the H-bridged circuit is designed with the second connected condition, the FETd 77v and 76u' are turned off and the FETs 78v' and 75u are turned on. A sum of a running period t of the first connected condition and a running period t' of the second connected condition is always calculated at a constant period. The duty ratio η for the switching operation is determined based upon a time period ratio between the running periods t and t'. According to the second PWM control, the stator coils to be electrically excited are switched in the same order as the first PWM control. The FET to be turned on and off is then selected corresponding to each coil stator, thereby performing the switching operation in the same manner.

The second PWM control may not be preferable for performing the PWM control precisely within a region possessing a relatively low rotational speed of the motor 6. Namely, the semiconductor-switching element such as the FET or a bipolar transistor is utilized as a switching element for each coil. When this type of semiconductor switching element is applied with a precipitous switching waveform for use of the PWM control, the output waveform does not always possess a precipitous edge such that a delay δt may arise. The delay δt may easily arise especially when the switching element is turned off. Therefore, especially when the switching operation is demanded at a high speed, it is preferable to utilize the FET rather than the bipolar transistor.

Figure 17:
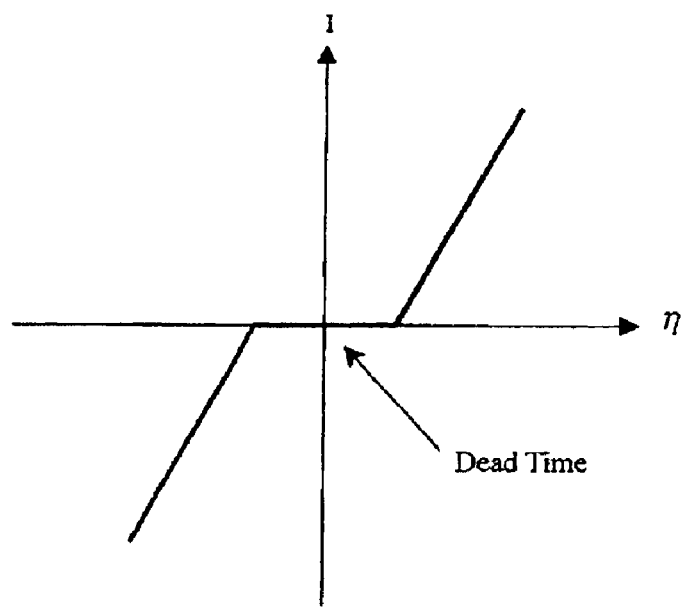
FIG. 17 is a graph schematically explaining a relationship between the duty ratio and the motor current under the second PWM control.
Figure 18:
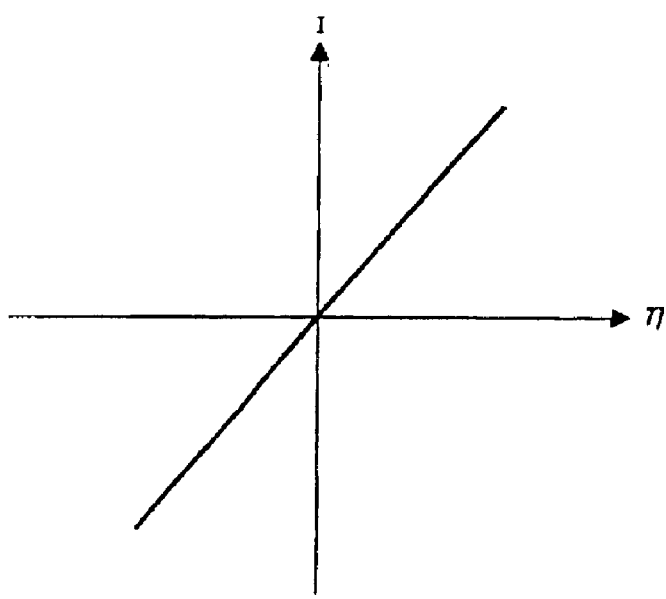
FIG. 18 is a graph schematically explaining a relationship between the duty ratio and the motor current under the first PWM control.

When the polarity of each two coil of the three-phase brushless motor 6 is inverted, the switching element for switching each coil is required to be turned on and off at a time. However, when a switching signal for a positive polarity and a switching signal for a negative polarity is sent to the corresponding switching element at a time, a problem may arise that two exciting circuits with two polarities respectively are connected to the power source at a time for a short time, due to the aforementioned delay δt. Therefore, in light of the delay δt, it is preferable that a constant interval is defined between the switching signal for the positive polarity and the switching signal for the negative polarity. Any of the coils are not electrically excited during the interval which actually corresponds to a dead time. As illustrated in FIG. 17, the duty ratio η for setting the turning-on period shorter than the dead time does not suit its purpose. Therefore, the linearity of the motor 6 in the second PWM control may deteriorate when the motor rotates with a relatively low load. For example, the second PWM control is not preferable for gradually approximating the vehicle wheel steering shaft angle position to the target angle position. Further, the motor 6 may easily vibrate due to the dead time when the motor 6 is controlled under the second PWM control during the rotation with the low load.

In the meantime, the motor 6 is not easily influenced by the flywheel current. Therefore, the second PWM control is preferable to detect the current relatively precisely by the electric current sensor 70 while the motor 6 has rotated with a relatively large load such as a relatively large duty ratio η. The foregoing explanation can be easily proved by calculating the terminal voltage for each phase. For example, when the electric power is supplied from the stator coil U to the stator coil V, the terminal voltage for each phase is denoted with Vu, Vv, and Vw and the power supply voltage is denoted with Vs in the same manner. The U and V phases are turned on and off by the duty ratio η and the duty ratio 1−η, respectively. Therefore, the terminal voltage for each U and V phase is averaged and is expressed in accordance with the following formula:

$$Vu=\eta*Vs, \text{ and } Vv=(1-\eta)Vs.$$

The terminal voltage Vw becomes substantially equal to the averaged terminal voltage of the terminal voltages Vu and Vv and is expressed as follow:

$$Vw(Vu+Vv)/2.$$

The averaged value of the terminal voltages of the three phases of the motor 6 is calculated to be (1/2)Vs. This averaged value shows that the rotation of the motor 6 is effectively controlled without being influenced by the duty ratio.

As described above, according to the embodiment of the present invention, the electric current for electrically exciting the motor is detected by the electric current sensor 70 and the rotational speed of the motor is controlled by the PWM control. Either the first PWM control or the second PWM control is selected in response to the electric current detected by the electric current sensor 70. Therefore, according to the embodiment of the present invention, the electric current for the motor can be always detected with high detecting precision even when the motor for the vehicle wheel steering shaft has been turned on and off, i.e. has been switched.

According to the embodiment of the present invention, either the first PWM control or the second PWM control is performed depending on the comparison between the current detection value $I_S$ and the reference value $I_R$. Alternatively, the PWM control can be switched between the first PWM control and the second PWM control depending on a comparison between a parameter reflected with the motor detection value $I_S$ and a threshold value. For example, when a power steering apparatus is mounted in the vehicle, the rotational load of the vehicle wheels steering shaft does not widely vary corresponding to the vehicle driving condition such as the vehicle speed. Further, the motor rotation is not influenced by the load that much. Namely, the motor electric current can be determined based upon the rotational speed of the motor. Therefore, the motor rotational speed can be referred to in substitution for the motor detection value $I_S$.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. The plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A steering control system for a vehicle including a steering wheel shaft transmitted with an operation angle of a steering wheel, a vehicle wheel steering shaft to be steered at a vehicle wheel steering angle depending on the operation angle of the steering wheel and a vehicle driving condition, and a motor for rotating the vehicle wheel steering shaft at the vehicle wheel steering angle, the steering control system comprising:

a steering wheel shaft angle detecting means for detecting a steering wheel shaft angle position;

a vehicle wheel steering shaft angle detecting means for detecting a vehicle wheel steering shaft angle position;

a vehicle condition detecting means for detecting the vehicle driving condition;

a drive controlling means for determining a target angle position of the vehicle wheel steering shaft based upon the steering wheel shaft angle position and the vehicle driving condition, and for approximating the vehicle wheel steering shaft angle position to the target angle position; and a current detecting means for detecting an electric current supplied to the motor, wherein a rotational speed of the motor is adjusted by a duty ratio of a pulse width modulation control in response to an angle deviation of the vehicle wheel steering shaft angle position from the target angle position so as to follow the rotation of the vehicle wheel steering shaft to the rotation of the steering wheel shaft, and the motor is electrically excited by a direct current power source via first and second coils included in the motor, one end of the first coil being connected to one end of the second coil, the other end of the first coil and the other end of the second coil serving as a first power supply terminal and a second power supply terminal so as to electrically excite the first and second coils respectively, and wherein the PWM control includes a first PWM control and a second PWM control, the first PWM control is performed with the first and second power supply terminals, the first power supply terminal being kept non-switched under being connected to a first pole of the direct current power source, and the second power supply terminal capable of being switched under being connected to a second pole of the direct current power source, and the second PWM control is performed by switching a first connected condition and a second connected condition by turns, the first connected condition established with the first power supply terminal being connected to the first pole of the direct current power source and the second power supply terminal being connected to the second pole thereof, and the second connected condition established with the first power supply terminal being connected to the second pole thereof and the second power supply terminal being connected to the first pole, and the steering control system further comprising:

a PWM control selecting means included in the drive controlling means, the PWM control selecting means for selecting the first PWM control or the second PWM control, the first PWM control performed under a first driving condition in which the motor is supplied with an electric current being smaller than a reference value, and the second PWM control performed under a second driving condition in which the motor is supplied with an electric current being greater than the reference value.

2. A steering control system for a vehicle according to claim 1, further comprising:

a motor operation limiting means included in the drive controlling means, the motor operation limiting means for limiting the electric current to be supplied to the motor based upon the electric current detected by the current detecting means.

3. A steering control system for a vehicle according to claim 2, further comprising:

a lock mechanism capable of switching a locked condition and an unlocked condition, the locked condition established for connecting the steering wheel shaft and the vehicle wheel steering shaft being mechanically disconnected from the steering wheel shaft for their integral rotation so as to directly transmit a manual operation force applied to the steering wheel shaft to the vehicle wheel steering shaft, and the unlocked condition established for releasing the steering wheel shaft and the vehicle wheel steering shaft from the locked condition; and a lock controlling means included in the motor operation limiting means, the lock controlling means capable of stopping the operation of the motor during the locked condition of the lock mechanism.

4. A steering control system for a vehicle according to claim 1, wherein the PWM control selecting means selects the first PWM control or the second PWM control based upon a comparison between the electric current detected by the electric current detecting means and a threshold value.

5. A steering control system for a vehicle according to claim 2, wherein the PWM control selecting means selects the first PWM control or the second PWM control based upon a comparison between the electric current detected by the electric current detecting means and a threshold value.

6. A steering control system for a vehicle according to claim 3, wherein the PWM control selecting means selects the first PWM control or the second PWM control based upon a comparison between the electric current detected by the electric current detecting means and a threshold value.

* * * * *